(No Model.) 2 Sheets—Sheet 1.

F. E. CADY.
COMBINED WATER FILTER AND COOLER.

No. 293,562. Patented Feb. 12, 1884.

WITNESSES
F. L. Durand
H. N. Jenkins

INVENTOR
Frank E. Cady
by Alex Mahon
Attorney

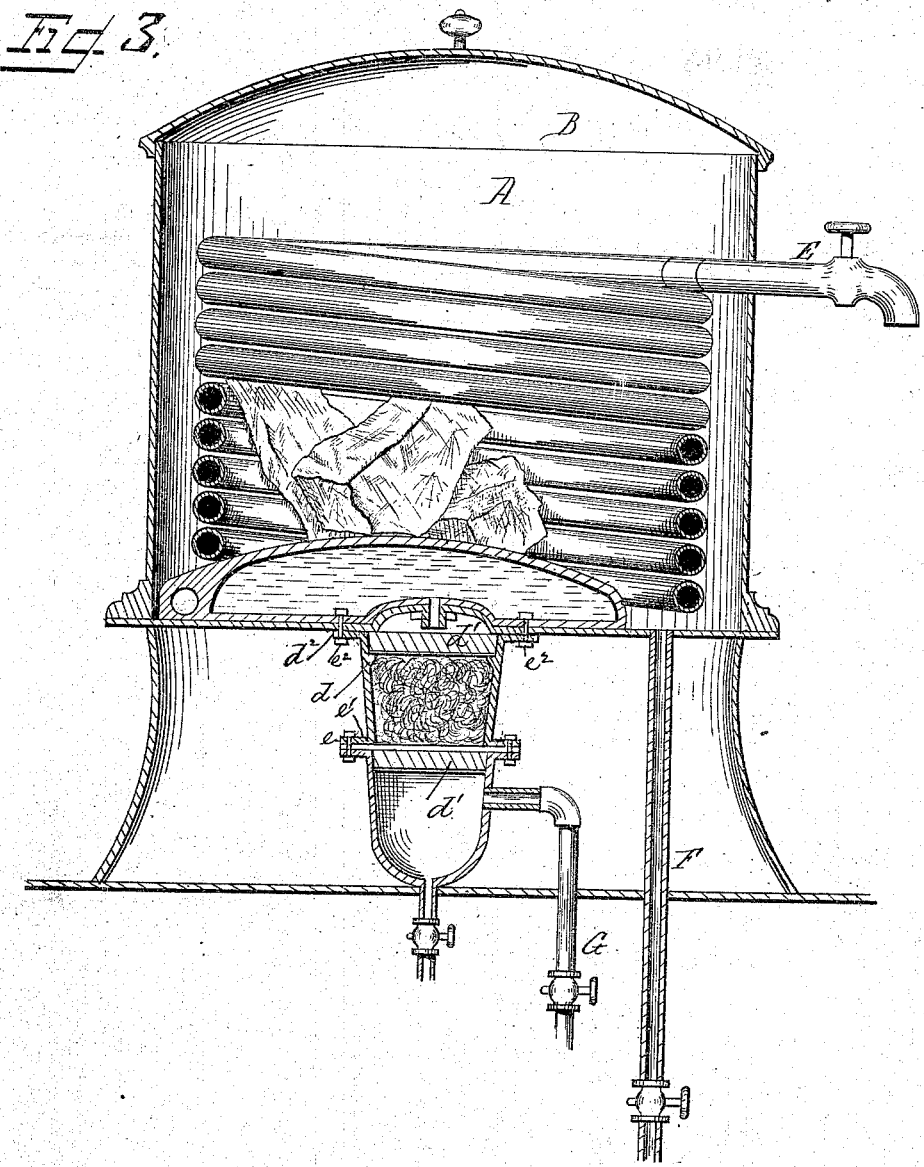

UNITED STATES PATENT OFFICE.

FRANK E. CADY, OF AUBURN, NEW YORK.

COMBINED WATER FILTER AND COOLER.

SPECIFICATION forming part of Letters Patent No. 293,562, dated February 12, 1884.

Application filed June 25, 1883. (No model.)

*To all whom it may concern:*

Be it known that I, FRANK E. CADY, of Auburn, county of Cayuga, State of New York, have invented certain new and useful Improvements in a Combined Water Filter and Cooler, of which the following is a full and exact description, reference being had to the accompanying drawings, making part of this specification, in which—

Figure 1:
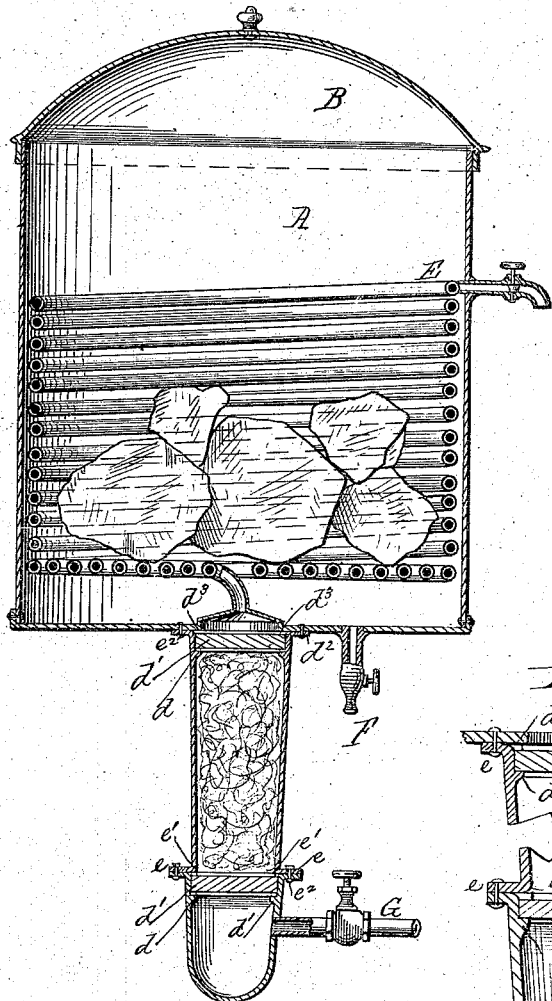
Figure 2:
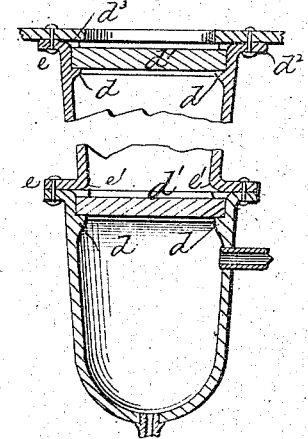

Figure 1 is a section through the improved cooler and filter. Fig. 2 is a section of the bottom of the inclosing-case and the upper and lower portion of the filter, showing the manner of connecting the sediment-chamber to the filter and the filter to the cooler. Fig. 3 shows a modification in the manner of connecting the pipe to the filter.

My invention consists, first, in the combination, with the filter and sediment-chambers, of the coil connected therewith and forming a continuous passage from said chamber to the outlet-pipe, for cooling the water in its passage from the filter to the escape-pipe.

It further consists in the combination, with the filter and sediment-chamber, of a coil constituting a receptacle for the ice and forming a continuous passage from the filter to the outlet-pipe.

It further consists in the combination, with the supply pipe or main and with the coil, of the filter located between the coil and supply-pipe, for filtering and cooling the water in its passage from the supply pipe or main to the outlet-pipe.

It further consists in the combination, with the supply pipe or main and with the filter, of the coil arranged within the inclosing-case and forming a continuous passage from the supply-pipe to the outlet-pipe.

It further consists in forming the coil into a receptacle for the ice, and in arranging the same above the bottom of the inclosing-case, whereby a receptacle for the dripping from the ice is formed, and in providing said receptacle with an outlet-pipe for draining off the drippings from said ice.

It further consists in providing the upper end of the filter and sediment-chamber with an inwardly-projecting rim forming a receptacle for receiving the disk, stone, or other suitable filtering material, and in the manner of connecting the sediment-chamber, filter, and inclosing-case together, whereby the disk or stone is securely held in place, and at the same time the parts can be readily disconnected from each other, and to certain details in the construction and arrangement of parts, all as will be hereinafter explained.

In the accompanying drawings, A represents an inclosing-case, which may be of any preferred form, and which is provided with any suitable form of cover, as shown at B. The filter and sediment-chambers are made in tapering form, substantially as shown, and are each provided near their upper edges with an inwardly-projecting rim or flange, $d$ $d'$, forming in the upper ends of said filter and sediment-chamber a receptacle for a disk or stone, $d'$, or other suitable filtering material hereinafter referred to. The upper end of the filtering-chamber is provided with an outwardly-projecting rim or flange, $d^2$, by which said chamber is connected to the bottom of the inclosing-case. The bottom of the inclosing-case is provided with a suitable perforation for the passage of the water from the filter to the coil, hereinafter referred to, which perforation is of less diameter than the open end of the filtering-chamber, so that when the filter is bolted to said case the disk or stone shall be securely held between the projecting edge $d^3$ thereof and the inwardly-projecting rim $d$, formed in the upper end of the filtering-chamber. This filtering-chamber, as before stated, is made in tapering form, and is provided at its lower end with a projecting rim or flange, $e$. The lower end of this filtering-chamber is of less diameter than the upper end of the sediment-chamber, and when bolted thereto forms a shoulder, $e'$, between which and the inwardly-projecting flange $d$, formed in said sediment-chamber, the lower disk or stone is held. The upper and lower end of the filtering-chamber, as also the upper end of the sediment-chamber, are provided with outwardly-projecting flanges, by which they are secured one to the other by means of suitable bolts, as shown at $e^2$, by which means it will be seen that the parts are adapted to be readily disconnected from each other for cleaning without disturbing the other parts. The pipe through which the water passes from the filter to the outlet-cock in being cooled is connected at one end to the opening formed in the bottom of the inclosing-case in any preferred manner, and extends up a short distance from the bottom of said case, and is then coiled outwardly toward the inclosing-case, forming the bottom of the receptacle or a table upon which the ice may be placed, and leaving a space between the lower edge thereof and the bottom of the inclosing-case for the dripping from the ice. This pipe is extended up adjacent to the sides of the inclosing-case in spiral form to near the top thereof, at which point it is connected with the outlet-cock, as shown at E. By this arrangement it will be seen that the water is caused to pass through a long length of pipe after leaving the filter, and as said pipe is brought into contact with the ice or other cooling agent the water will be thoroughly cooled before reaching the outlet-pipe, and this without being brought into direct contact with the ice. By extending the pipe into spiral form the capacity of the water-compartment is greatly increased without increasing the size of the cooler beyond the size of the ordinary water-coolers in common use. A modification in the manner of connecting the coil to the filter is shown, in which an enlarged cooling-receptacle is placed in the center of the inclosing-case, and to which receptacle the coil is connected, and being coiled in spiral form up to the escape-outlet in a similar manner to that heretofore described. In this case the top of the cooling-receptacle forms a table or support for the ice.

By making the filtering and sediment chambers in tapering form it will be seen that the disk or stone, as also the other filtering material placed between them, can be easily removed for cleaning or for other purposes.

The filtering material is arranged in the filtering-chamber in the following manner: A disk, stone, or other compact filtering material is placed in the upper end of the sediment-chamber resting upon the inwardly-projecting flange, before referred to, which is then bolted to the lower end of the filtering-chamber, having a suitable packing interposed between the adjacent faces of the flanges to form a tight joint. The loose filtering material is then placed or packed into the filtering-chamber up to and on a line with the upper edge of the inwardly-projecting flange thereof. A second disk or stone is then placed thereon, resting upon and held in position by the inwardly-projecting flanges thereof, and which stone is of such width as to fill the space between said flanges and the upper edges of the outwardly-projecting flanges, so that when said filtering-chamber is bolted to the inclosing-case said disk shall be firmly held between the flange and the inclosing-case. A suitable packing is also interposed between the outwardly-projecting flanges of the filtering-chamber and the case, to form a tight joint at this point similar to that formed between the lower end thereof and the sediment-chamber.

The inclosing-case is provided with a suitable pipe having a cock, F, for drawing off the drippings from the ice. If desired, however, this pipe may be extended down and connected to the supply-pipe, and the drippings thereof may be mingled with the water from the supply-pipe, thus assisting in cooling the same before it passes through the filtering material.

The manner of feeding the water to the filter from the drippings from the ice, and in cooling the water by the ice before being passed through the filter, is made the subject of a separate application, and is therefore not claimed herein.

The supply-pipe is shown at G, and is connected or penetrates the upper portion of the sediment-chamber, and which pipe may be connected to the street-main or to any other suitable supply-reservoir.

Modifications in the form of the filter and sediment-chambers and also in the manner of forming the coil may be employed without departing from the spirit or intent of my invention.

Having now described my invention, I claim—

1. In a combined cooler and filter, the filtering and sediment chambers, in combination with the coil connected therewith, and forming a continuous passage from said chambers to the outlet-pipe, substantially as described.

2. In a combined cooler and filter, a spiral coil for holding the filtered water, constituting a receptacle for the ice, and forming a continuous passage from the filter to the outlet-pipe, substantially as and for the purpose set forth.

3. In a combined filter and cooler, the combination, with a supply pipe or main, of a sediment-chamber arranged below the filter, a coil forming a receptacle for the ice, and a filter arranged between the sediment-chamber and coil for filtering the water in its passage from the supply to the outlet pipe, substantially as described.

4. In a combined cooler and filter, the combination, with the supply pipe or main, and with the filter and coil, of a cooling-chamber interposed between the filter and coil, substantially as and for the purpose described.

5. In a combined filter and cooler, the combination, with the coil forming a receptacle for the ice, of the inclosing-case surrounding the coil, and a filter located outside of the inclosing-case, and between the supply-pipe and coil, substantially as described.

In testimony whereof I have hereunto set my hand.

FRANK E. CADY.

Witnesses:
 CHAS. O'BRIEN,
 C. H. SHAPLEY.